(12) United States Patent
Tanaka

(10) Patent No.: US 11,059,215 B2
(45) Date of Patent: Jul. 13, 2021

(54) LIQUID-CONTAINING CONTAINER MANUFACTURING METHOD

(71) Applicant: YOSHINO KOGYOSHO CO., LTD., Tokyo (JP)

(72) Inventor: Toshimasa Tanaka, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 81 days.

(21) Appl. No.: 16/619,901

(22) PCT Filed: Jun. 8, 2018

(86) PCT No.: PCT/JP2018/022096
§ 371 (c)(1),
(2) Date: Dec. 5, 2019

(87) PCT Pub. No.: WO2019/003865
PCT Pub. Date: Jan. 3, 2019

(65) Prior Publication Data
US 2020/0164566 A1 May 28, 2020

(30) Foreign Application Priority Data
Jun. 30, 2017 (JP) .............................. JP2017-129907

(51) Int. Cl.
*B29C 49/46* (2006.01)
*B29C 49/48* (2006.01)
(Continued)

(52) U.S. Cl.
CPC .......... *B29C 49/4802* (2013.01); *B29C 49/46* (2013.01); *B67C 3/26* (2013.01);
(Continued)

(58) Field of Classification Search
CPC ............ B29C 49/46; B29C 2049/4664; B29C 2049/481; B29C 49/4802
See application file for complete search history.

(56) References Cited

U.S. PATENT DOCUMENTS 7,744,365 B2 * 6/2010 Maddox .................. B29C 49/42
425/522
2015/0076105 A1 3/2015 Sato et al.
(Continued)

FOREIGN PATENT DOCUMENTS

| EP | 2 902 169 A1 | 8/2015 |
| EP | 3 075 517 A1 | 10/2016 |

(Continued)

OTHER PUBLICATIONS

Jul. 10, 2018 International Search Report issued in International Patent Application No. PCT/JP2018/022096.
(Continued)

*Primary Examiner* — Robert B Davis
(74) *Attorney, Agent, or Firm* — Oliff PLC

(57) ABSTRACT

A liquid-containing container manufacturing method includes: a liquid blow molding step of, in a state in which a reversal panel formation part forms a convex surface projecting toward inside of a cavity, supplying a pressurized liquid into a preform placed inside a cavity, to mold the preform into a container including a reversal panel; and a headspace formation step of pressing the container by a press part to reverse the reversal panel, and thereafter releasing press by the press part to increase a volume of the container and thereby form a headspace.

6 Claims, 12 Drawing Sheets

(51) Int. Cl.
   *B67C 3/26*      (2006.01)
   *B29K 23/00*     (2006.01)
   *B29K 67/00*     (2006.01)
   *B29L 31/00*     (2006.01)
   *B67C 3/22*      (2006.01)

(52) U.S. Cl.
   CPC .............. *B29C 2049/4664* (2013.01); *B29C 2049/481* (2013.01); *B29K 2023/12* (2013.01); *B29K 2067/003* (2013.01); *B29L 2031/7158* (2013.01); *B67C 2003/227* (2013.01)

(56) References Cited

U.S. PATENT DOCUMENTS

2015/0328823 A1* 11/2015 Kannengiesser ....... B65B 3/022
                                                      206/525
2019/0232545 A1*  8/2019 Tabata ................... B29C 49/12
2019/0240891 A1*  8/2019 Ishii .................... B29C 49/4273

FOREIGN PATENT DOCUMENTS

| JP | 2010-179063 A | 8/2010 |
| JP | 2014-069441 A | 4/2014 |
| JP | 2015-104805 A | 6/2015 |
| JP | 2016-504219 A | 2/2016 |
| JP | 2017-094686 A | 6/2017 |
| WO | 2017/090340 A1 | 6/2017 |

OTHER PUBLICATIONS

Feb. 23, 2021 Extended Search Report issued in European Patent Application No. 18824320.8.

* cited by examiner

LIQUID-CONTAINING CONTAINER MANUFACTURING METHOD

TECHNICAL FIELD

The present disclosure relates to a liquid-containing container manufacturing method of manufacturing a liquid-containing container containing a content liquid from a synthetic resin-made preform.

BACKGROUND

Synthetic resin-made containers such as bottles made of polypropylene (PP) and bottles made of polyethylene terephthalate (PET) are used to contain, as content liquids, various liquids including beverages, cosmetics, medicines, detergents, and toiletries such as shampoos. Such a container is typically manufactured by blow molding a preform made of a thermoplastic synthetic resin material such as the above-mentioned materials.

As a blow molding method of molding a preform into a container, liquid blow molding using a pressurized liquid instead of pressurized air as a pressurized medium supplied into a preform is known.

For example, PTL 1 describes a liquid blow molding method whereby a synthetic resin-made preform preheated to a temperature at which stretchability is developed is placed in a blow molding mold and a pressurized liquid is supplied into the preform from a nozzle unit to mold the preform into a container of a predetermined shape along the cavity of the blow molding mold.

With this liquid blow molding method, a content liquid to be contained in the container as a product, such as a beverage, can be used as the liquid supplied into the preform to simultaneously mold the container and fill the container with the content liquid, thus manufacturing a liquid-containing container containing the content liquid. Therefore, a liquid-containing container manufacturing method using liquid blow molding can manufacture a liquid-containing container at low cost, with no need for a step of filling the molded container with the content liquid.

CITATION LIST

Patent Literature

PTL 1: JP 2016-504219 A

SUMMARY

Technical Problem

In the case where the liquid to be contained in the container is used as the pressurized medium for use in liquid blow molding as in the foregoing conventional liquid-containing container manufacturing method, it is desirable to form a headspace (a space not filled with the content liquid) of an appropriate size inside the molded container, as in the case where a container obtained by blow molding using pressurized air is filled with the content liquid.

To form a headspace of a desired size inside the container, the foregoing conventional liquid-containing container manufacturing method uses a blow molding mold including a compression tab (press part). After molding the preform into the shape along the cavity of the blow molding mold by liquid blow molding, the compression tab is advanced toward the inside of the cavity to press the molded container by the compression tab, thus returning a predetermined amount of the content liquid to the nozzle unit from inside the molded container. The mouth part of the container is then opened to form a headspace of a size corresponding to the predetermined amount inside the container. Such a headspace formation step of returning a predetermined amount of the content liquid to the nozzle unit has room for improvement.

It could therefore be helpful to provide a liquid-containing container manufacturing method including an improved headspace formation step.

Solution to Problem

A liquid-containing container manufacturing method according to the present disclosure is a liquid-containing container manufacturing method of manufacturing a liquid-containing container containing a content liquid from a synthetic resin-made preform using a manufacturing device that includes a blow molding mold and a nozzle unit, the blow molding mold including a reversal panel formation part, the manufacturing device including a press part, and the liquid-containing container manufacturing method comprising: a liquid blow molding step of, in a state in which the reversal panel formation part forms a convex surface projecting toward inside of a cavity, supplying a pressurized liquid into the preform placed in the cavity from the nozzle unit, to mold the preform into a container including a reversal panel formed by the reversal panel formation part; and a headspace formation step of pressing the container by the press part to reverse the reversal panel so as to project toward outside of the container, and thereafter releasing press by the press part to increase a volume of the container and thereby form a headspace.

Preferably, in the liquid-containing container manufacturing method according to the present disclosure, the blow molding mold includes the press part, the cavity is deformable from a first form in which the reversal panel formation part forms the convex surface projecting toward the inside of the cavity to a second form in which the reversal panel formation part retreats toward outside of the cavity and the press part advances toward the inside of the cavity, in the liquid blow molding step, the pressurized liquid is supplied into the preform placed in the cavity in the first form from the nozzle unit, to mold the preform into the container including the reversal panel formed by the reversal panel formation part, and in the headspace formation step, the cavity is deformed into the second form to press the container by the press part and reverse the reversal panel so as to project toward the outside of the container, and thereafter the press by the press part is released to increase the volume of the container and thereby form the headspace.

Preferably, in the liquid-containing container manufacturing method according to the present disclosure, the blow molding mold includes a pair of reversal panel formation parts facing each other and each being the reversal panel formation part and a pair of press parts facing each other and each being the press part, the reversal panel formation parts and the press parts alternate in a circumferential direction in a predetermined cross section orthogonal to a central axis of the cavity, and the cavity is deformable from the first form in which the pair of reversal panel formation parts each form the convex surface to the second form in which the pair of reversal panel formation parts each retreat toward the outside of the cavity and the pair of press parts each advance toward the inside of the cavity, in the liquid blow molding step, the pressurized liquid is supplied into the preform placed in the cavity in the first form from the nozzle unit, to mold the preform into the container including a pair of reversal panels formed by the pair of reversal panel formation parts, and in the headspace formation step, the cavity is deformed into the second form to press the container by the pair of press parts and reverse the pair of reversal panels so as to each project toward the outside of the container, and thereafter the press by the pair of press parts is released to increase the volume of the container and thereby form the headspace.

Preferably, in the liquid-containing container manufacturing method according to the present disclosure, in the headspace formation step, the container is pressed by the press part to reverse the reversal panel so as to project toward the outside of the container, in a state in which a mouth part of the container is closed.

It is thus possible to provide a liquid-containing container manufacturing method including an improved headspace formation step.

DETAILED DESCRIPTION

Figure 1A:
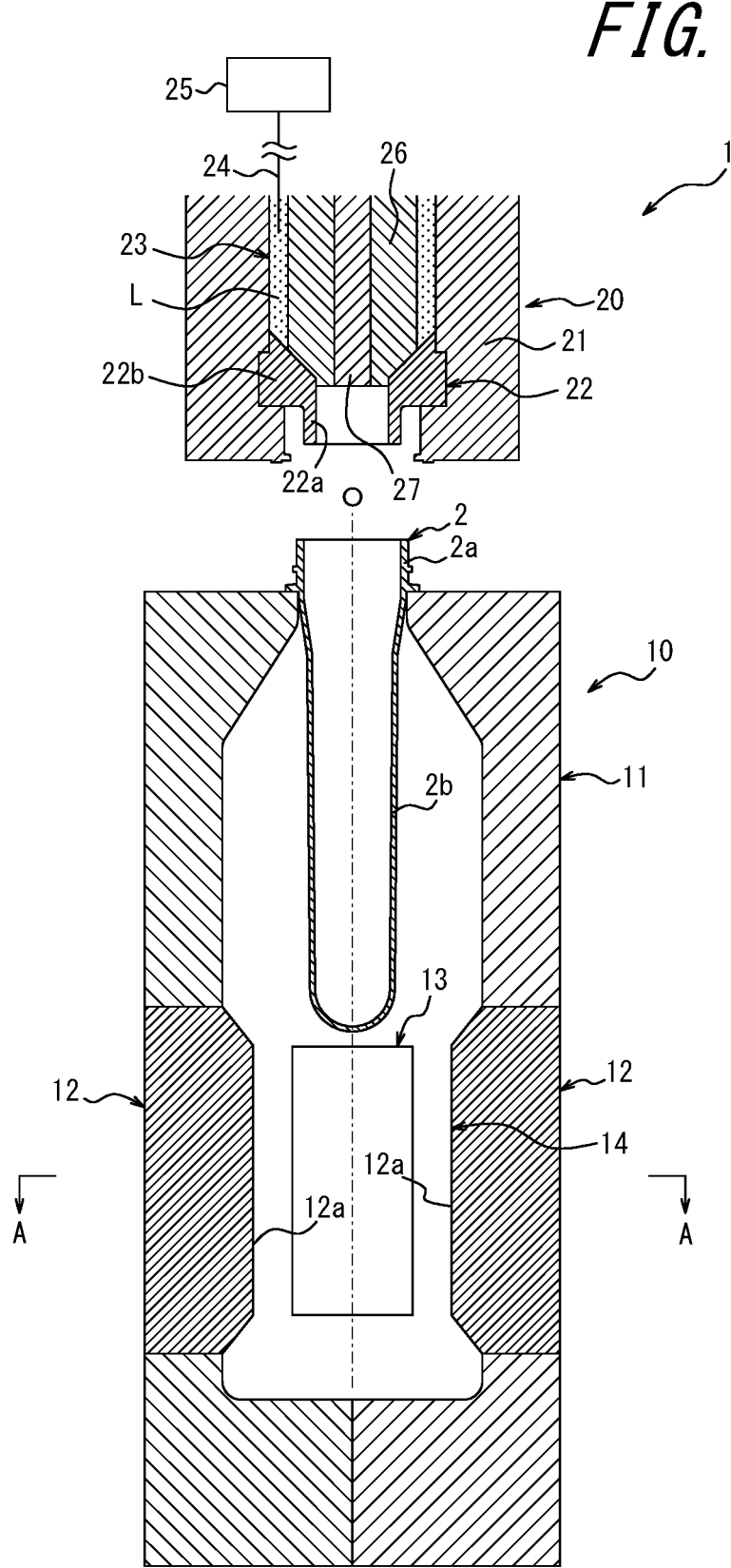
FIG. 1A is an explanatory diagram illustrating an example of a liquid-containing container manufacturing device used in a liquid-containing container manufacturing method which is Embodiment 1 of the present disclosure, in a state in which a preform is placed in a blow molding mold.

More detailed description will be given below with reference to the drawings.

A liquid-containing container manufacturing method which is Embodiment 1 of the present disclosure will be described below, with reference to FIGS. 1A to 5B.

The liquid-containing container manufacturing method which is Embodiment 1 of the present disclosure is a liquid-containing container manufacturing method of manufacturing a liquid-containing container containing a content liquid from a synthetic resin-made preform using a manufacturing device that includes a blow molding mold and a nozzle unit, the blow molding mold including a reversal panel formation part, the manufacturing device including a press part, and the liquid-containing container manufacturing method comprising: a liquid blow molding step of, in a state in which the reversal panel formation part forms a convex surface projecting toward inside of a cavity, supplying a pressurized liquid into the preform placed in the cavity from the nozzle unit, to mold the preform into a container including a reversal panel formed by the reversal panel formation part; and a headspace formation step of pressing the container by the press part to reverse the reversal panel so as to project toward outside of the container, and thereafter releasing press by the press part to increase a volume of the container and thereby form a headspace.

In the liquid-containing container manufacturing method according to this embodiment, the blow molding mold includes the press part, and the cavity is deformable from a first form in which the reversal panel formation part forms the convex surface projecting toward the inside of the cavity to a second form in which the reversal panel formation part retreats toward outside of the cavity and the press part advances toward the inside of the cavity. In the liquid blow molding step, the pressurized liquid is supplied into the preform placed in the cavity in the first form from the nozzle unit, to mold the preform into the container including the reversal panel formed by the reversal panel formation part. In the headspace formation step, the cavity is deformed into the second form to press the container by the press part and reverse the reversal panel so as to project toward the outside of the container, and thereafter the press by the press part is released to increase the volume of the container and thereby form the headspace.

In the liquid-containing container manufacturing method according to this embodiment, the blow molding mold includes a pair of reversal panel formation parts facing each other and each being the reversal panel formation part and a pair of press parts facing each other and each being the press part, the reversal panel formation parts and the press parts alternate in a circumferential direction in a predetermined cross section orthogonal to a central axis of the cavity, and the cavity is deformable from the first form in which the pair of reversal panel formation parts each form the convex surface to the second form in which the pair of reversal panel formation parts each retreat toward the outside of the cavity and the pair of press parts each advance toward the inside of the cavity. In the liquid blow molding step, the pressurized liquid is supplied into the preform placed in the cavity in the first form from the nozzle unit, to mold the preform into the container including a pair of reversal panels formed by the pair of reversal panel formation parts. In the headspace formation step, the cavity is deformed into the second form to press the container by the pair of press parts and reverse the pair of reversal panels so as to each project toward the outside of the container, and thereafter the press by the pair of press parts is released to increase the volume of the container and thereby form the headspace.

In the liquid-containing container manufacturing method according to this embodiment, in the headspace formation step, the container is pressed by the press part to reverse the reversal panel so as to project toward the outside of the container, in a state in which a mouth part of the container is closed.

Such a liquid-containing container manufacturing method according to this embodiment can be implemented, for example, using a manufacturing device 1A of a structure illustrated in FIG. 1A.

The manufacturing device 1A illustrated in FIG. 1A manufactures a liquid-containing container C (see FIG. 5A) containing a content liquid from a synthetic resin-made preform 2. A liquid (content liquid) L contained in the liquid-containing container C may be any of various liquids L such as beverages, cosmetics, medicines, detergents, and toiletries such as shampoos.

The preform 2 is, for example, made of a thermoplastic synthetic resin material such as polypropylene (PP) or polyethylene terephthalate (PET), and shaped like a bottomed cylinder having a cylindrical mouth part 2a forming an open end and a cylindrical barrel part 2b connected to the mouth part 2a and closed at its lower end.

Although not specifically illustrated, the outer wall surface of the mouth part 2a has an engaging protrusion for attaching a closure cap (not illustrated) to the mouth part 2a of the molded liquid-containing container C by capping (undercut engagement). Instead of the engaging protrusion, the outer wall surface of the mouth part 2a may have an external thread to attach a closure cap to the mouth part 2a by screw connection.

Figure 1B:
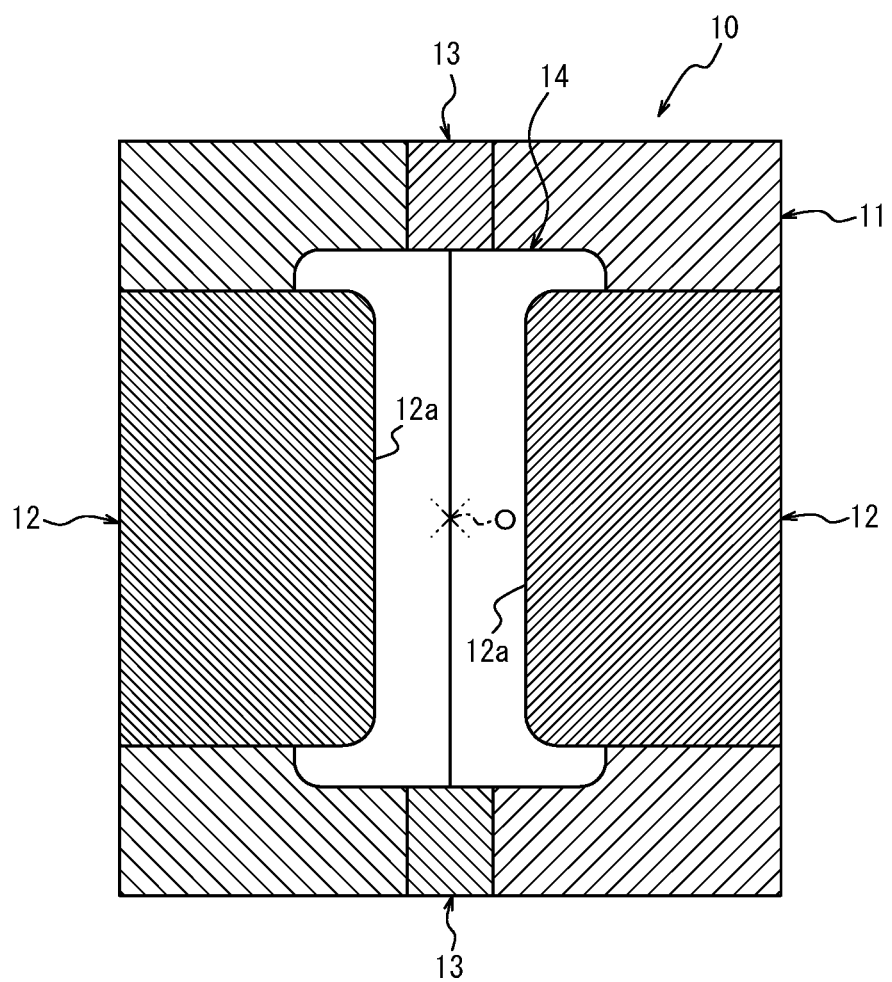
FIG. 1B is a sectional diagram along A-A in FIG. 1A.

As illustrated in FIGS. 1A and 1B, the manufacturing device 1A includes a blow molding mold 10. The blow molding mold 10 includes a mold body part 11, a pair of reversal panel formation parts 12 facing each other, and a pair of press parts 13 facing each other. The mold body part 11, the pair of reversal panel formation parts 12, and the pair of press parts 13 form a cavity 14 inside the blow molding mold 10. The reversal panel formation parts 12 and the press parts 13 alternate in the circumferential direction in a predetermined cross section (a section along line A-A in FIG. 1A in this embodiment) orthogonal to the central axis O of the cavity 14, as illustrated in FIG. 1B. The pair of reversal panel formation parts 12 are each driven by a drive part (not illustrated), and are movable in a direction in which their ends approach each other and in the opposite direction. Likewise, the pair of press parts 13 are each driven by a drive part (not illustrated), and are movable in a direction in which their ends approach each other and in the opposite direction. The cavity 14 is deformable from a first form (see FIGS. 1A to 2B) in which the pair of reversal panel formation parts 12 each form a convex surface 12a projecting toward the inside of the cavity 14 to a second form (see FIGS. 4A and 4B) in which the pair of reversal panel formation parts 12 each retreat toward the outside of the cavity 14 and the pair of press parts 13 each advance toward the inside of the cavity 14. The cavity 14 is also deformable from the second form to a third form (see FIGS. 5A and 5B) in which the pair of press parts 13 each return to the same position as in the first form. The cavity 14 in the third form has a shape corresponding to the final shape of the liquid-containing container C such as a bottle shape.

As illustrated in FIG. 1A, the cavity 14 is open upward at the upper surface of the blow molding mold 10. The preform 2 is placed in the cavity 14. More specifically, the preform 2 is placed in the blow molding mold 10 with the barrel part 2b being located inside the cavity 14 of the blow molding mold 10 and the mouth part 2a projecting upward from the blow molding mold 10.

The blow molding mold 10 is openable right and left. By opening the blow molding mold 10 right and left after molding the preform 2 into the liquid-containing container C, the liquid-containing container C can be taken out of the blow molding mold 10. Although the mold body part 11 is opened right and left in FIG. 1A in this embodiment, the mold opening structure of the blow molding mold 10 for taking the liquid-containing container C out of the blow molding mold 10 may be changed as appropriate.

The manufacturing device 1A includes a nozzle unit 20. The nozzle unit 20 is located above the blow molding mold 10, and is movable in the vertical direction relative to the blow molding mold 10. The nozzle unit 20 includes a main block 21 and a filling nozzle 22.

The filling nozzle 22 has a structure in which a cylindrical nozzle body 22a to be inserted into the mouth part 2a of the preform 2 and a large-diameter sandwiching part 22b are integrally formed. The filling nozzle 22 is fixed to the main block 21 as a result of the sandwiching part 22b being fitted onto the inner surface of the main block 21. The nozzle body 22a is located coaxially with the cavity 14 of the blow molding mold 10. When the nozzle unit 20 is lowered to a predetermined position, the nozzle body 22a engages with the mouth part 2a of the preform 2 placed in the blow molding mold 10.

A liquid supply path 23 extending in the vertical direction coaxially with the nozzle body 22a is formed inside the main block 21. The liquid supply path 23 is a flow path for supplying the liquid L to the filling nozzle 22, and communicates with the filling nozzle 22 at its lower end.

The liquid supply path 23 is connected to a pressurized liquid supply part 25 through a piping 24. The pressurized liquid supply part 25 can supply the liquid L pressurized to a predetermined pressure to the liquid supply path 23 through the piping 24. For the pressurized liquid supply part 25, for example, a plunger pump may be used as a pressurization source.

The pressurized liquid L supplied from the pressurized liquid supply part 25 to the liquid supply path 23 is then supplied from the liquid supply path 23 into the preform 2 placed in the blow molding mold 10 through the filling nozzle 22. Thus, the preform 2 is liquid blow molded into the container C of a shape along the cavity 14 of the blow molding mold 10, by the pressurized liquid L.

A seal body 26 for opening and closing the filling nozzle 22 relative to the liquid supply path 23 is provided in the liquid supply path 23. The seal body 26 has a cylindrical shape extending along the axis of the liquid supply path 23, and is movable in the vertical direction in the liquid supply path 23. When the seal body 26 moves to the lower stroke end and its lower end surface abuts on the upper surface of the sandwiching part 22b, the communication between the liquid supply path 23 and the nozzle body 22a is blocked by the seal body 26, and the filling nozzle 22 is closed from the liquid supply path 23. When the seal body 26 moves upward from the closed state and its lower end surface separates from the upper surface of the sandwiching part 22b, the liquid supply path 23 and the nozzle body 22a communicate with each other, and the filling nozzle 22 is opened to the liquid supply path 23.

By operating the pressurized liquid supply part 25 in a state in which the nozzle body 22a engages with the mouth part 2a of the preform 2 and the seal body 26 is opened to cause the liquid supply path 23 to communicate with the filling nozzle 22, the pressurized liquid L can be supplied into the preform 2 from the pressurized liquid supply part 25 through the liquid supply path 23 and the filling nozzle 22 to liquid blow mold the preform 2.

The liquid blow molding device 1A may include a stretching rod 27, as illustrated in the drawing. The stretching rod 27 is inserted in the axial center of the seal body 26 to be movable in the vertical direction relative to the seal body 26, and can appear from the lower end of the seal body 26 into the cavity 14 in a retractable manner. As a result of the stretching rod 27 moving downward, the preform 2 can be stretched in the axial direction by the stretching rod 27. Thus, in the case where the liquid blow molding device 1A includes the stretching rod 27, the liquid blow molding device 1A can perform biaxial stretching blow molding of stretching the preform 2 in the radial direction by the pressurized liquid L while stretching the preform 2 in the axial direction by the stretching rod 27. Biaxial stretching blow molding prevents misalignment of the preform 2, and enables more accurate molding of the preform 2 into the container C. The stretching rod 27 may be omitted from the liquid blow molding device 1A.

A method (liquid-containing container manufacturing method according to this embodiment) of manufacturing the liquid-containing container C of a predetermined shape containing the content liquid L by liquid blow molding the synthetic resin-made preform 2 using the liquid blow molding device 1A having such a structure will be described below.

Figure 2A:
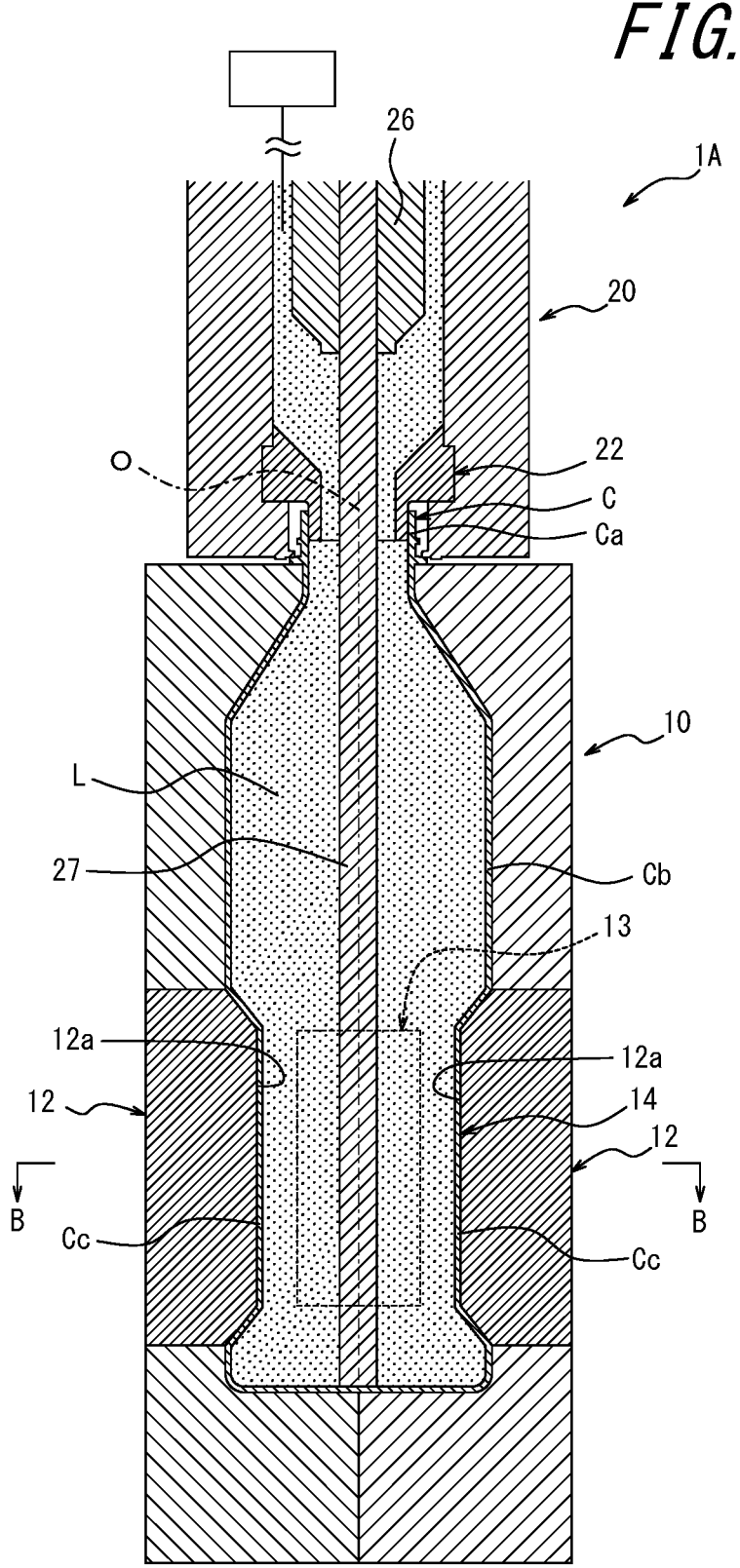
FIG. 2A is an explanatory diagram illustrating the liquid-containing container manufacturing device in a state in which a liquid blow molding step is performed according to Embodiment 1 of the present disclosure.
Figure 2B:
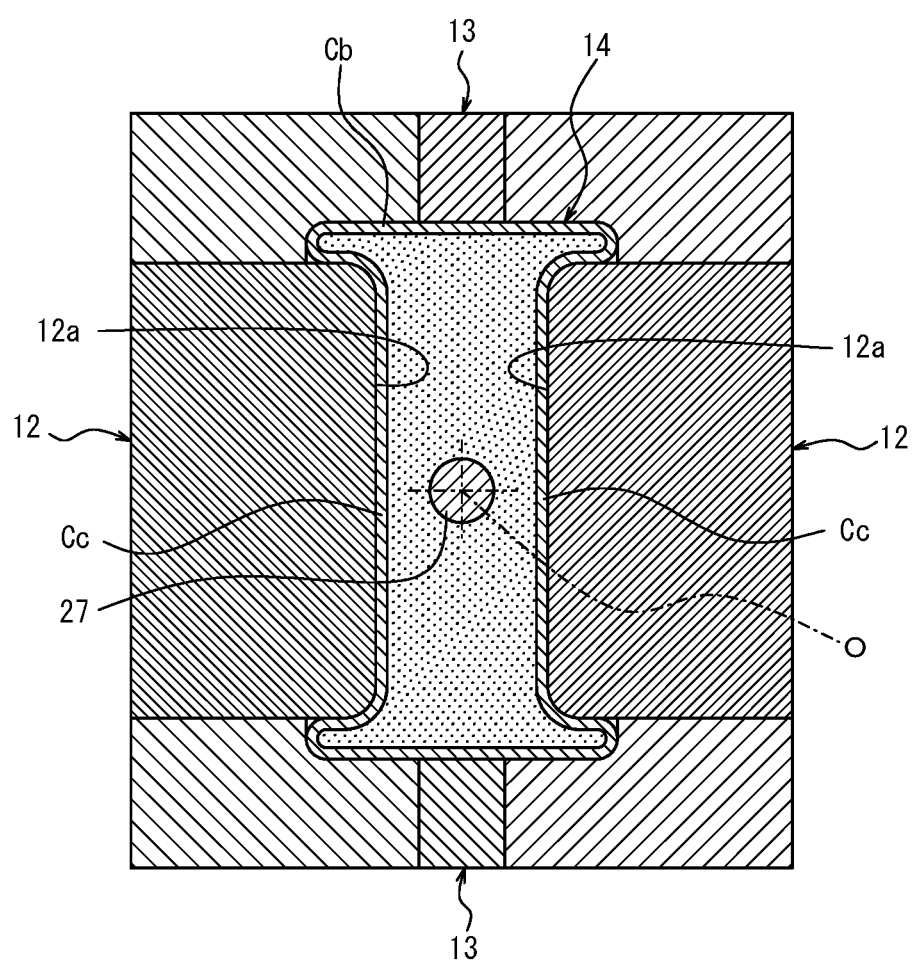
FIG. 2B is a sectional diagram along B-B in FIG. 2A.

A liquid blow molding step is performed first. In the liquid blow molding step, first, the preform 2 is placed in the cavity 14 in the first form, as illustrated in FIG. 1A. More specifically, the preform 2 preheated to such a predetermined temperature (e.g. 80° C. to 150° C.) at which stretchability is developed using a heating means such as a heater (not illustrated) is placed in the blow molding mold 10 whose cavity 14 is in the first form as illustrated in FIGS. 1A and 1B, and the blow molding mold 10 is clamped. Next, the nozzle unit 20 is lowered to cause the nozzle body 22a of the filling nozzle 22 to engage with the mouth part 2a of the preform 2. Following this, the seal body 26 is moved upward to open the filling nozzle 22, and the pressurized liquid supply part 25 is operated. Consequently, the pressurized liquid L is supplied from the pressurized liquid supply part 25 to the liquid supply path 23, and, through the filling nozzle 22, supplied into the preform 2 from the mouth part 2a. As a result of the pressurized liquid L being supplied into the preform 2, the preform 2 is liquid blow molded into the container C of a shape along the cavity 14 in the first form of the blow molding mold 10, as illustrated in FIGS. 2A and 2B. Here, the container C has a mouth part Ca and a barrel part Cb wider than the mouth part Ca, and the barrel part Cb has a pair of reversal panels Cc formed by (the convex surfaces 12a of) the pair of reversal panel formation parts 12.

In the liquid blow molding step, biaxial stretching blow molding of stretching the preform 2 in the vertical direction (axial direction) using the stretching rod 27 may be performed, as illustrated in FIG. 2A. The supply of the liquid L may be started before, during, or after the stretching in the axial direction by the stretching rod 27. Alternatively, liquid blow molding may be performed using only the liquid L, without using the stretching rod 27.

Figure 3:
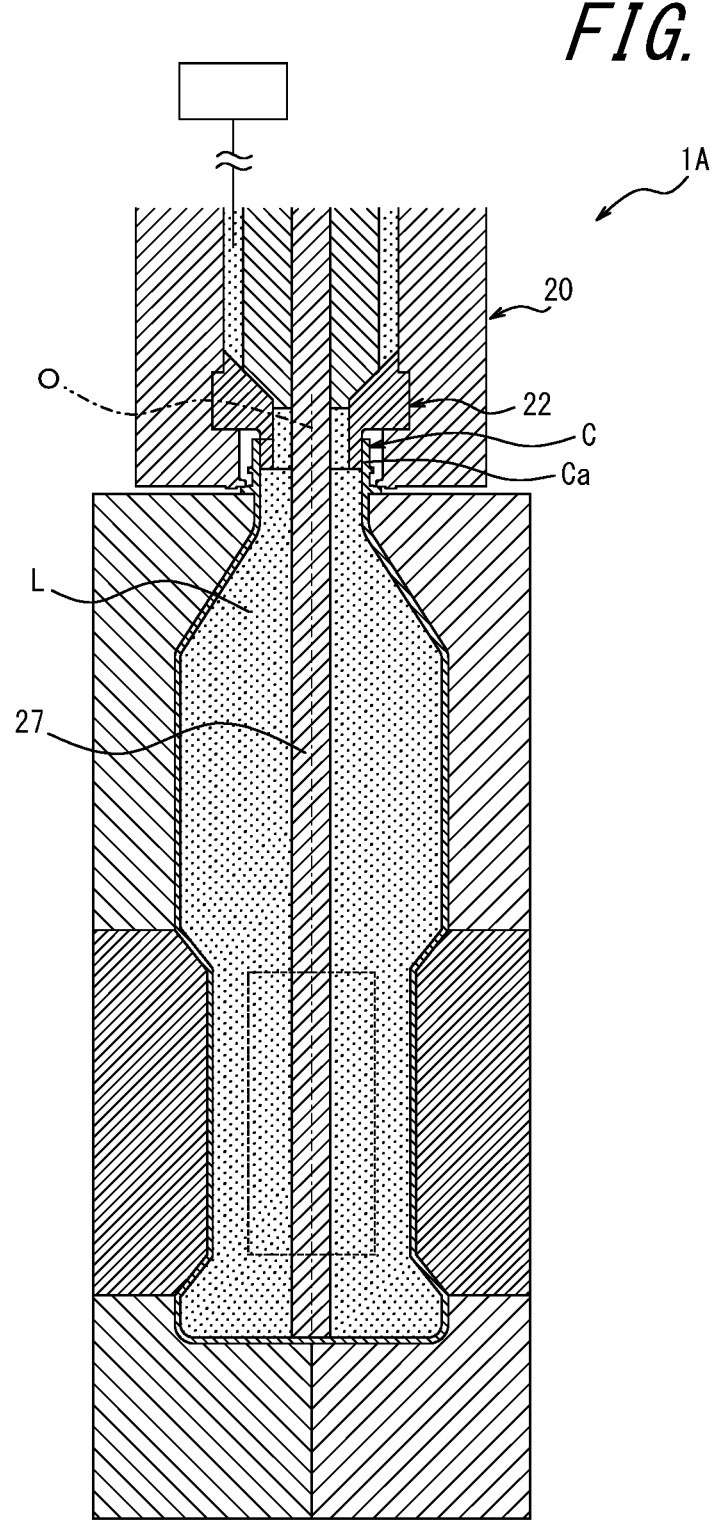
FIG. 3 is an explanatory diagram illustrating the liquid-containing container manufacturing device with a mouth part of a container being closed in a state in which a cavity is in a first form in a headspace formation step according to Embodiment 1 of the present disclosure.

After the blow molding step ends, a headspace formation step is performed. In the headspace formation step in this embodiment, first, the filling nozzle 22 is closed to close the mouth part Ca of the container C, as illustrated in FIG. 3. The length of the part of the stretching rod 27 projecting from the seal body 26 when the mouth part Ca is closed may be adjusted as appropriate depending on a desired size of a headspace HS and the like. If the length of the projecting part of the stretching rod 27 when the mouth part Ca is closed is longer, the amount of air corresponding to the volume of the projecting part can be introduced into the container C to expand the headspace HS when subsequently the stretching rod 27 is separated from the container C and the mouth part Ca is opened in the headspace formation step.

Figure 4A:
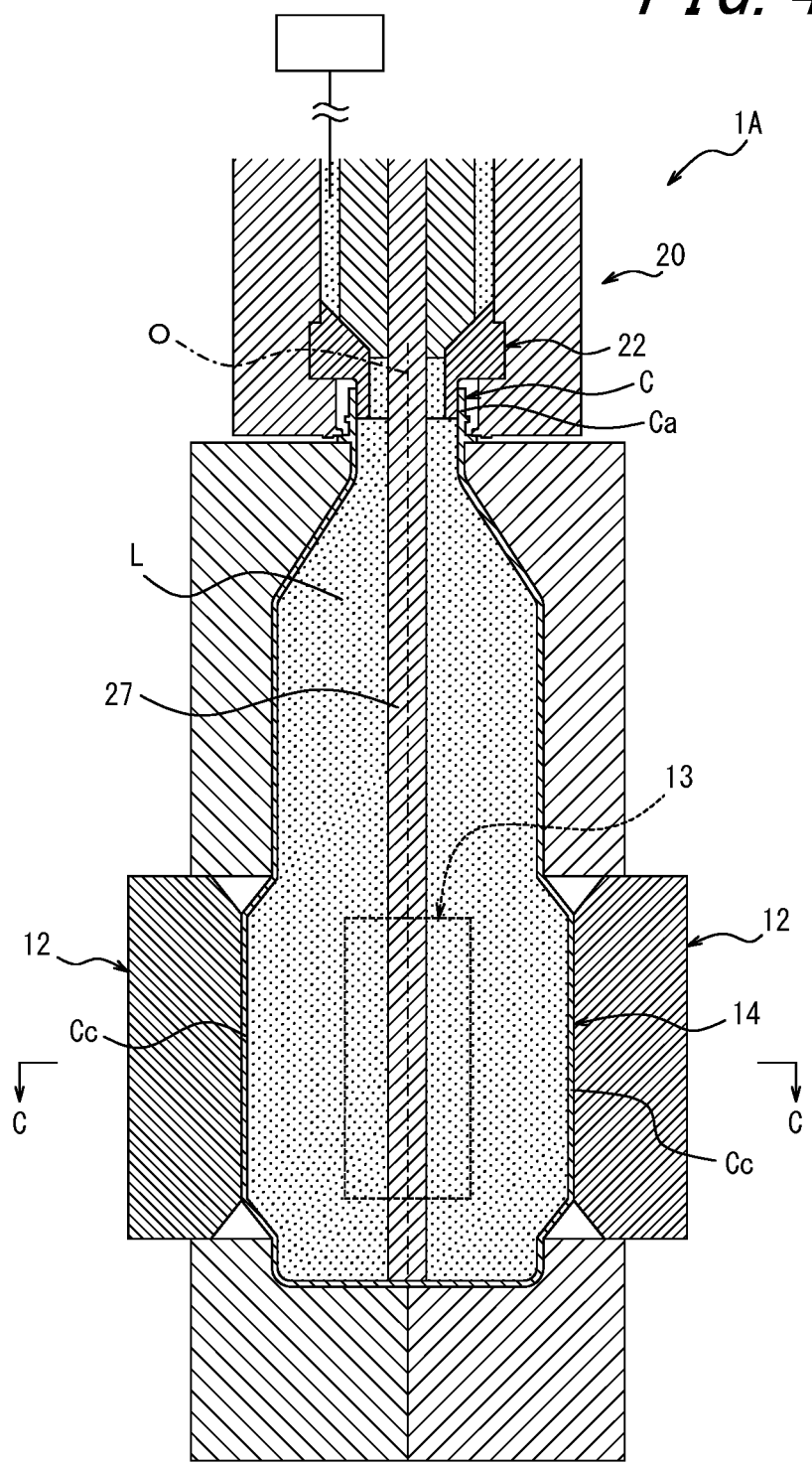
FIG. 4A is an explanatory diagram illustrating the liquid-containing container manufacturing device in a state in which the cavity is deformed into a second form from the state in FIG. 3 according to Embodiment 1 of the present disclosure.
Figure 4B:
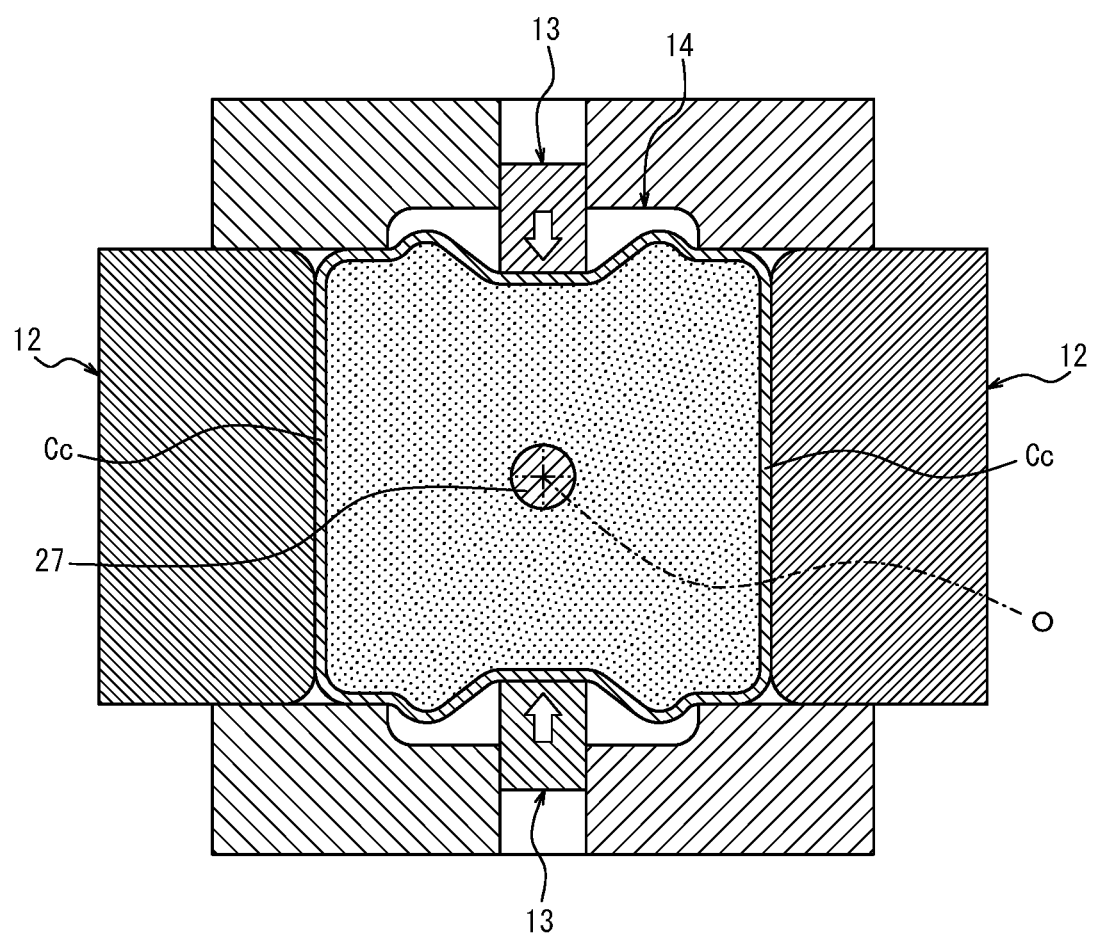
FIG. 4B is a sectional diagram along C-C in FIG. 4A.

In the state in which the mouth part Ca of the container C is closed, the cavity 14 is deformed into the second form, as illustrated in FIGS. 4A and 4B. That is, the pair of reversal panel formation parts 12 are retreated toward the outside of the cavity 14, and the pair of press parts 13 are advanced toward the inside of the cavity 14. By deforming the cavity 14 into the second form in this way, the pair of press parts 13 press (the barrel part Cb of) the container C to reverse the pair of reversal panels Cc so as to project toward the outside of the container C. When deforming the cavity 14 into the second form, the pair of press parts 13 may be advanced after retreating the pair of reversal panel formation parts 12, the pair of press parts 13 may be advanced while retreating the pair of reversal panel formation parts 12, or the pair of reversal panel formation parts 12 may be retreated after advancing the pair of press parts 13. In the case of retreating the pair of reversal panel formation parts 12 after advancing the pair of press parts 13, the retreat may be performed mechanically, or by using the projecting deformation force of the reversal panels Cc by the press of the press parts 13 (i.e. by pressing with the projecting force of the reversal panels Cc). The positions, shapes, advance/retreat strokes, etc. of the pair of press parts 13 and the pair of reversal panel formation parts 12 may be set as appropriate so that the pair of reversal panels Cc can be reversed toward the outside, based on the specific gravity of the liquid L, the thickness of the container C, and the like.

Figure 5A:
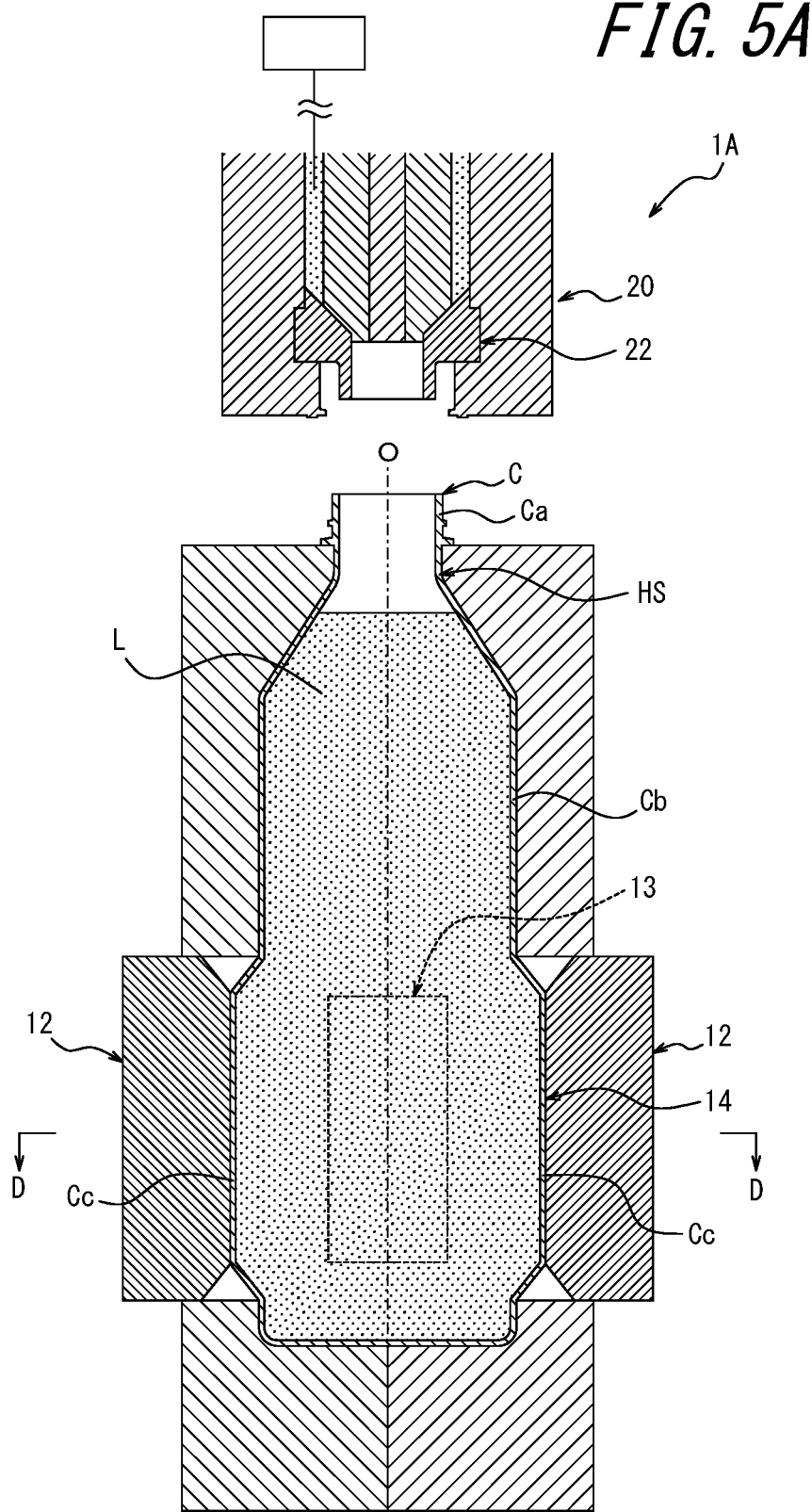
FIG. 5A is an explanatory diagram illustrating the liquid-containing container manufacturing device in a state in which press by press parts is released from the state in FIG. 4A and headspace formation is completed according to Embodiment 1 of the present disclosure.
Figure 5B:
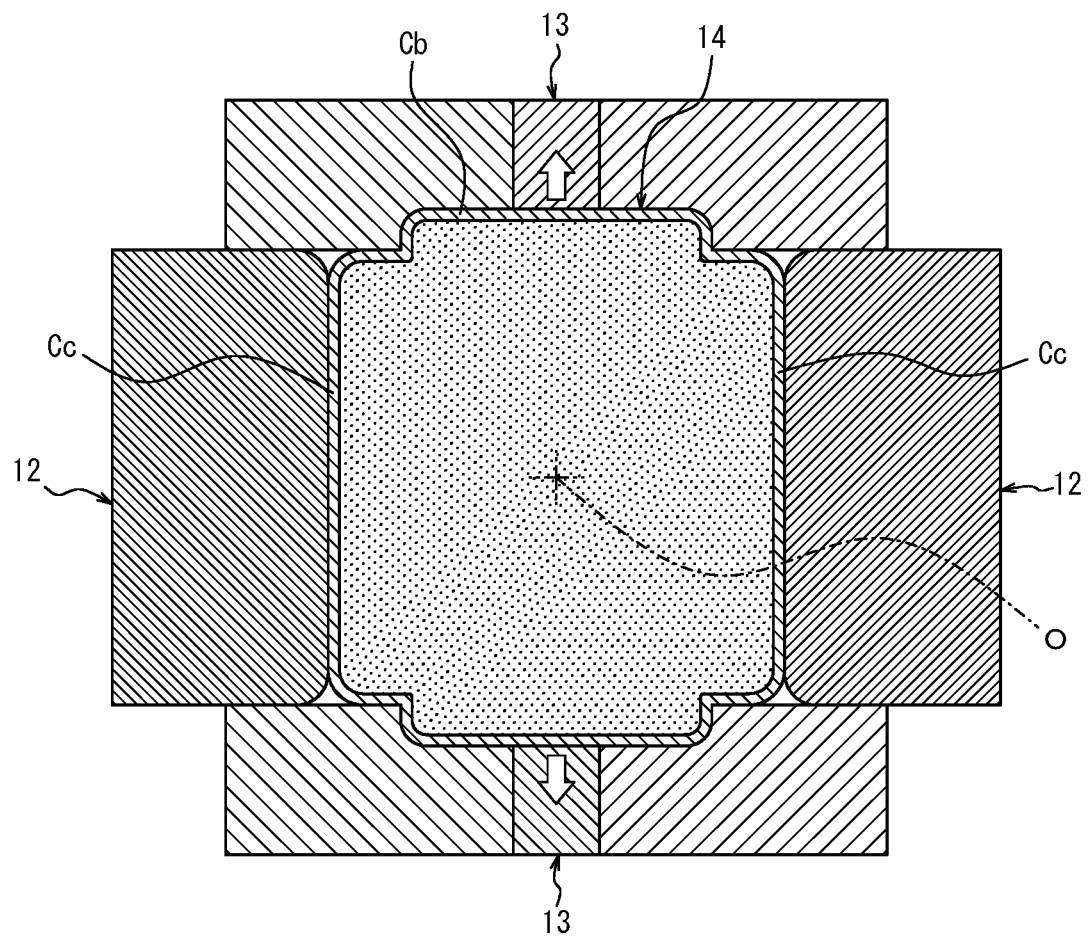
FIG. 5B is a sectional diagram along D-D in FIG. 5A.

Next, the nozzle unit 20 is raised to open the mouth part Ca, and the cavity 14 is deformed into the third form, as illustrated in FIGS. 5A and 5B. That is, the pair of press parts 13 are each returned to the same position as in the first form. By deforming the cavity 14 into the third form in this way, the press by the pair of press parts 13 is released to cause restoring deformation of the part of the barrel part Cb of the container C pressed by the pair of press parts 13 (i.e. the amount of press by the press parts 13 is set in a range in which the container C can be restored), thus increasing the volume of the container C. As a result, air is introduced from the mouth part Ca to form the headspace HS inside the container C. Here, by raising the stretching rod 27 to separate the stretching rod 27 from the liquid L inside the container C, the amount of air corresponding to the volume of the part of the stretching rod 27 immersed in the liquid L can be introduced into the container C to expand the headspace HS. The timing at which the stretching rod 27 is raised may be set as appropriate. The timing may be before the opening of the mouth part Ca, the same as the opening of the mouth part Ca, or after the release of the press by the pair of press parts 13. In this embodiment, the press by the pair of press parts 13 is released after opening the mouth part Ca, to increase the volume of the container C and at the same time introduce air from the mouth part Ca. Alternatively, after releasing the press by the pair of press parts 13 to increase the volume of the container C and set the inside of the container C to negative pressure, the mouth part Ca may be opened to introduce air from the mouth part Ca and form the headspace HS.

In the headspace formation step in this embodiment, the cavity 14 is deformed into the second form in a state in which the mouth part Ca of the container C is closed by the nozzle unit 20 whose filling nozzle 22 is closed. Alternatively, for example, after deforming the cavity 14 into the second form in a state in which the nozzle unit 20 is separated from the mouth part Ca of the container C to open the mouth part Ca, the cavity 14 may be deformed into the third form to form the headspace HS.

With the liquid-containing container manufacturing method according to this embodiment, the container C is pressed by the press parts 13 to reverse the reversal panels Cc so as to project toward the outside of the container C, and then the press by the press parts 13 is released to increase the volume of the container C and thereby form the headspace HS. Thus, the headspace HS can be formed without discharging the liquid L from the molded container C. It is therefore unnecessary to use a special device for discharging the liquid L from the molded container C. In the case where the headspace HS is formed by pressing the container C by the press parts 13 (or by a suck back step of sucking the liquid L into the nozzle unit 20) while the filling nozzle 22 remains open after the molding of the container C to return the liquid L from the container C to the nozzle unit 20, there is a possibility that air bubbles (resulting from entrainment of air present inside the preform 2 into the pressurized liquid L when the pressurized liquid L is supplied into the preform 2) enter the nozzle unit 20 together with the liquid L. With the liquid-containing container manufacturing method according to this embodiment, such entry of air bubbles can be avoided because the liquid L need not be returned from the container C to the nozzle unit 20.

In this embodiment, the mold body part 11, the pair of reversal panel formation parts 12, and the pair of press parts 13 form the cavity 14, and, in the headspace formation step, the headspace HS is formed in a state in which the container C is placed in the cavity 14. That is, in this embodiment, the blow molding mold 10 includes the pair of press parts 13. This may be modified as follows: The pair of press parts 13 are provided outside the cavity 14, and the mold body part 11 and the pair of reversal panel formation parts 12 form the cavity 14 (i.e. in the manufacturing device 1A, the pair of press parts 13 are not included in the blow molding mold 10). In the headspace formation step, after opening the blow molding mold 10 and taking the container C out of the cavity 14 (including both a state in which the blow molding mold 10 is simply open and a state in which the container C is moved from the blow molding mold 10), the container C is pressed by the pair of press parts 13 to reverse the pair of reversal panels Cc so as to project toward the outside of the container C, and then the press by the pair of press parts 13 is released to increase the volume of the container C, thus forming the headspace HS. In this case, in the headspace formation step, the container C may be pressed by the pair of press parts 13 to reverse the reversal panels Cc so as to project toward the outside of the container C in a state in which the mouth part Ca of the container C is closed, or the container C may be pressed by the pair of press parts 13 to reverse the reversal panels Cc so as to project toward the outside of the container C in a state in which the mouth part Ca of the container C is open.

Figure 7:
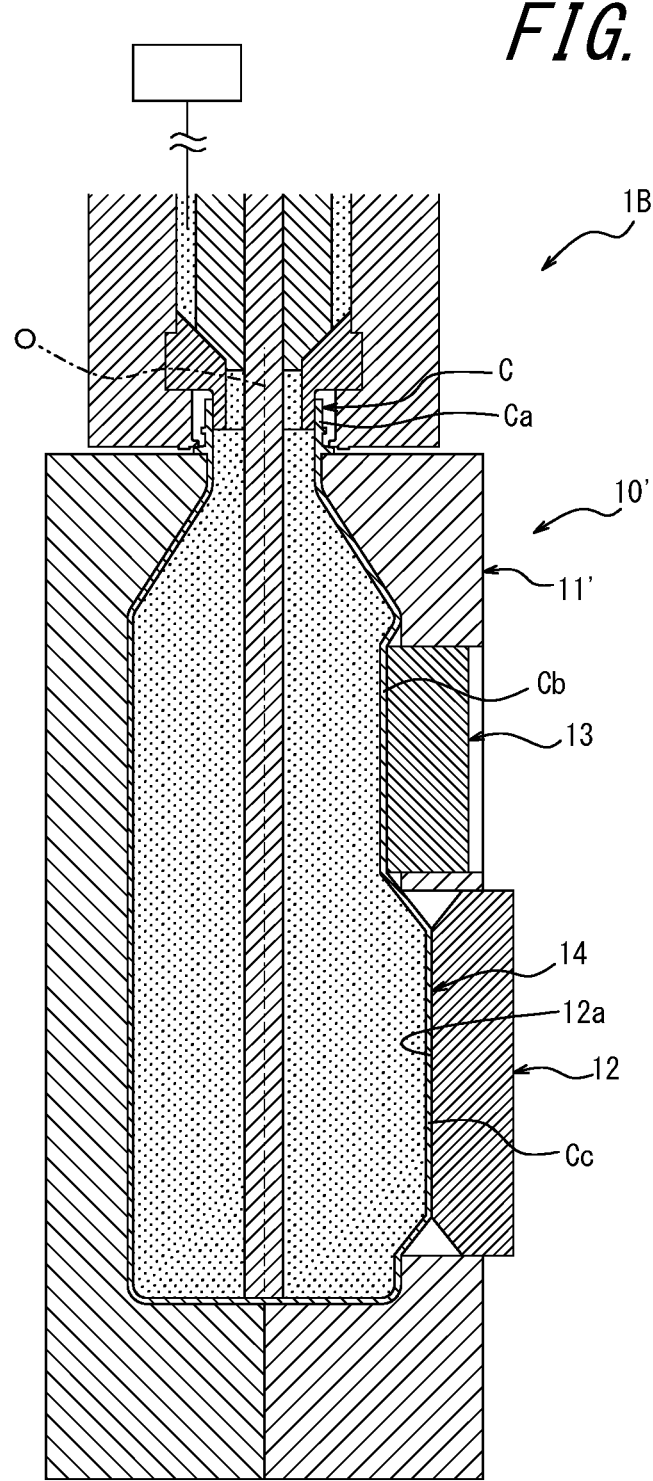
FIG. 7 is an explanatory diagram illustrating the liquid-containing container manufacturing device in a state in which the cavity is deformed into a second form from the state in FIG. 6 according to Embodiment 2 of the present disclosure.
Figure 8:
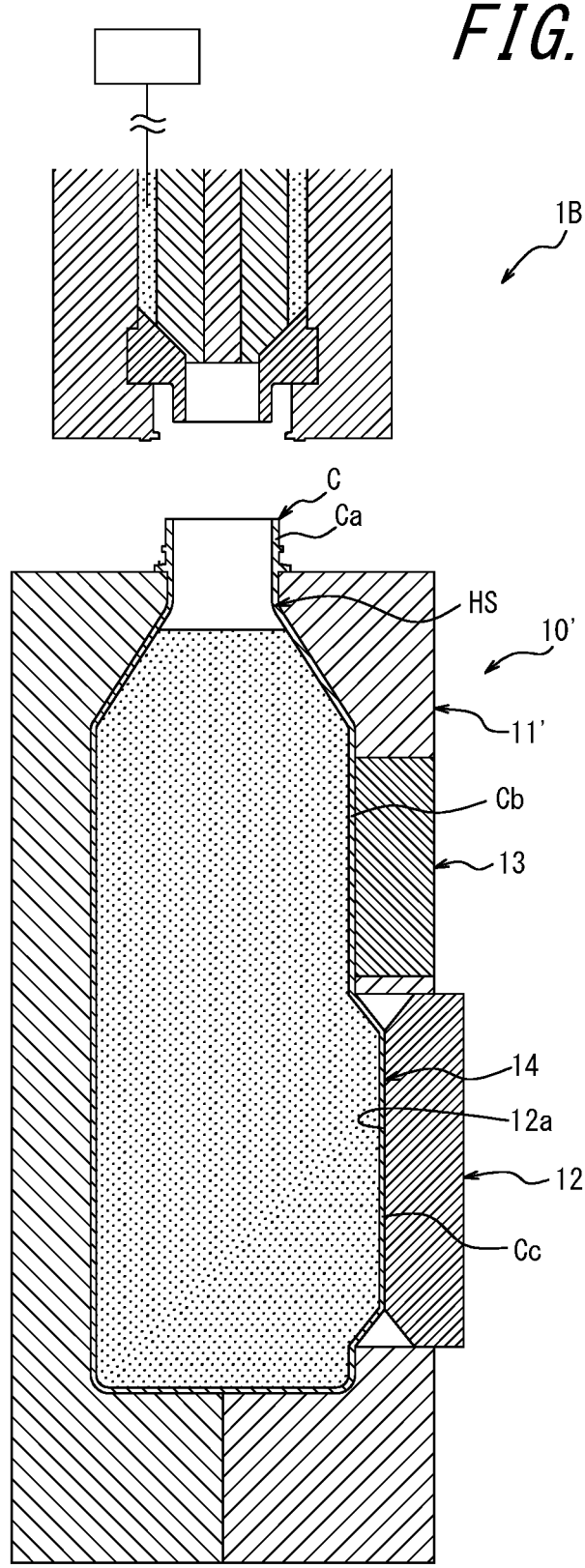
FIG. 8 is an explanatory diagram illustrating the liquid-containing container manufacturing device in a state in which press by a press part is released from the state in FIG. 7 and headspace formation is completed according to Embodiment 2 of the present disclosure.

A liquid-containing container manufacturing method which is Embodiment 2 of the present disclosure will be described below, with reference to FIGS. 6 to 8.

Figure 6:
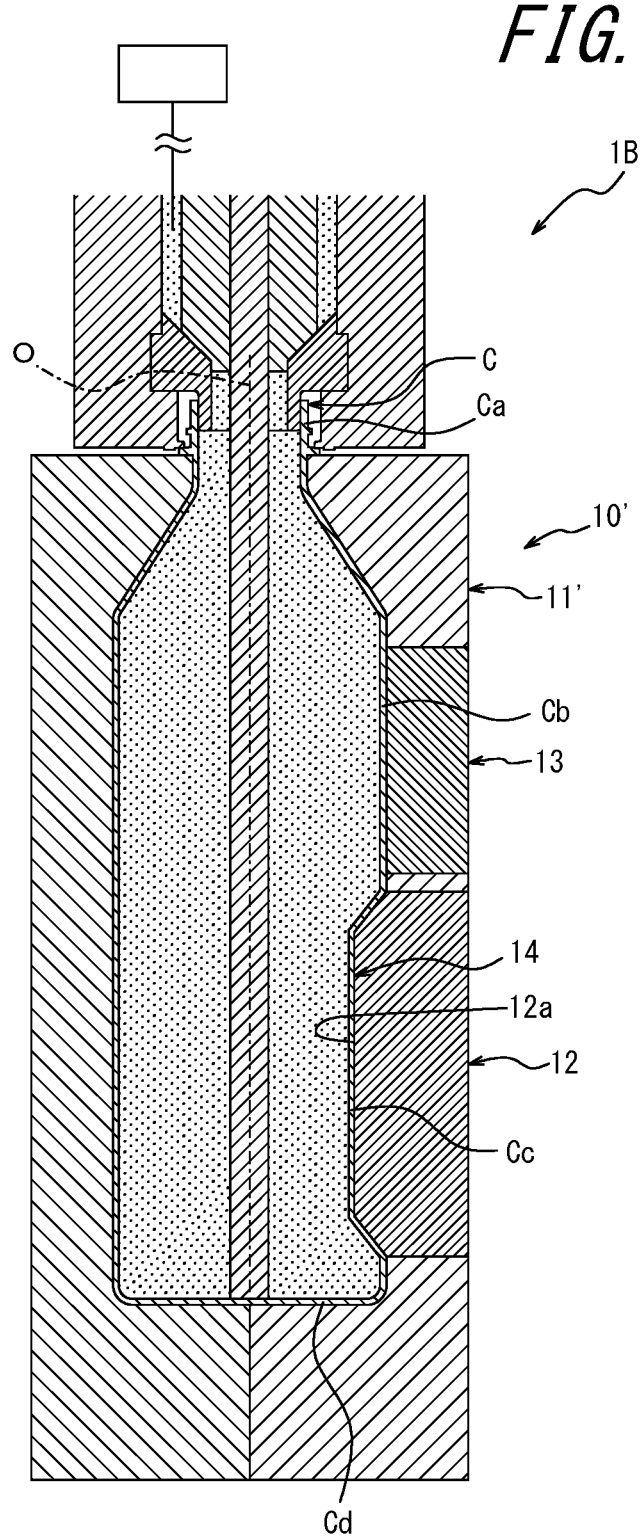
FIG. 6 is an explanatory diagram illustrating an example of a liquid-containing container manufacturing device used in a liquid-containing container manufacturing method which is Embodiment 2 of the present disclosure, with a mouth part of a container being closed in a state in which a cavity is in a first form in a headspace formation step.

The liquid-containing container manufacturing method according to this embodiment can be implemented, for example, using a liquid-containing container manufacturing device 1B of a structure illustrated in FIG. 6.

The liquid-containing container manufacturing device 1B includes a blow molding mold 10' in which one reversal panel formation part 12 and one press part 13 are arranged in the vertical direction. The cavity 14 is deformable from a first form (see FIG. 6) in which the reversal panel formation part 12 forms a convex surface 12a projecting toward the inside of the cavity 14 to a second form (see FIG. 7) in which the reversal panel formation part 12 retreats toward the outside of the cavity 14 and the press part 13 advances toward the inside of the cavity 14. The cavity 14 is also deformable from the second form to a third form (see FIG. 8) in which the press part 13 returns to the same position as in the first form. The other structures are the same as those in the manufacturing device 1A in Embodiment 1.

In a headspace formation step in the liquid-containing container manufacturing method according to this embodiment, the cavity 14 is deformed from the first form (see FIG. 6) into the second form (see FIG. 7) in a state in which the mouth part Ca of the container C is closed to press the container C by the press part 13 and reverse the reversal panel Cc so as to project toward the outside of the container C, and then the cavity 14 is deformed into the third form (see FIG. 8) to release the press by the press part 13 and increase the volume of the container C, thus forming the headspace HS.

With the liquid-containing container manufacturing method according to this embodiment, the structure of the blow molding mold 10' is simplified, so that the mold opening structure of the blow molding mold 10' for taking the liquid-containing container C out of the blow molding mold 10' can be selected from a wider range of choices.

In this embodiment, the reversal panel formation part 12 and the press part 13 are arranged in the vertical direction. Alternatively, the reversal panel formation part 12 and the press part 13 may be arranged in the circumferential direction around the central axis O of the cavity 14 (or arranged to face each other). The reversal panel formation part 12 and/or the press part 13 may be located at a position corresponding to a bottom part Cd of the container C. The blow molding mold 10' may include a plurality of reversal panel formation parts 12, and may include a plurality of press parts 13. The reversal panel formation part 12 and/or the press part 13 may be located at a position corresponding to a region in the barrel part Cb of the container C adjacent to the mouth part Ca (i.e. a shoulder region having a tapered surface that increases in width downward from the lower end of the mouth part Ca). As an example, by pressing the container C by the press part 13 located at a position corresponding to the barrel part Cb of the container C (including the shoulder region in the barrel part Cb), the reversal panel Cc formed by the reversal panel formation part 12 located at a position corresponding to the bottom part Cd of the container C may be reversed. As another example, by pressing the container C by the press part 13 located at a position corresponding to the bottom part Cd of the container C, the reversal panel Cc formed by the reversal panel formation part 12 located at a position corresponding to the barrel part Cb of the container C (including the shoulder region in the barrel part Cb) may be reversed. In both cases, the reversal panel formation part 12 is preferably located at a position corresponding to the lower half of the barrel part Cb of the container C, because the reversal panel Cc can be easily reversed toward the outside of the container C by the hydraulic head pressure of the liquid L inside the container C, and a stable shape of the container C as a product can be easily achieved. In Embodiment 1, too, the reversal panel formation parts 12 are preferably located at a position corresponding to the lower half of the barrel part Cb.

In this embodiment, a mold body part 11', the reversal panel formation part 12, and the press part 13 form the cavity 14, and, in the headspace formation step, the headspace HS is formed in a state in which the container C is placed in the cavity 14. That is, in this embodiment, the blow molding mold 10' includes the press part 13. This may be modified as follows: The press part 13 is provided outside the cavity 14, and the mold body part 11' and the reversal panel formation part 12 form the cavity 14 (i.e. in the manufacturing device 1B, the press part 13 is not included in the blow molding mold 10'). In the headspace formation step, after opening the blow molding mold 10' and taking the container C out of the cavity 14 (including both a state in which the blow molding mold 10' is simply open and a state in which the container C is moved from the blow molding mold 10'), the container C is pressed by the press part 13 to reverse the reversal panel Cc so as to project toward the outside of the container C, and then the press by the press part 13 is released to increase the volume of the container C, thus forming the headspace HS.

The present disclosure is not limited to the foregoing embodiments, and various changes can be made without departing from the scope of the present disclosure.

For example, although each of the foregoing embodiments describes the case where the liquid-containing container manufacturing method according to the present disclosure is carried out using the manufacturing device 1A of the structure illustrated in FIG. 1A or the manufacturing device 1B of the structure illustrated in FIG. 6, the liquid-containing container manufacturing method according to the present disclosure may be carried out using a liquid-containing container manufacturing device of another structure or the like.

For example, although the blow molding mold 10 includes a pair of reversal panel formation parts 12 and a pair of press parts 13 in Embodiment 1, the blow molding mold 10 may include three or more reversal panel formation parts 12 and three or more press parts 13 that alternate in the circumferential direction in a predetermined cross section orthogonal to the central axis O of the cavity 14. The number of reversal panel formation parts 12 and the number of press parts 13 may be different. A pair of or three or more reversal panel formation parts 12 and a pair of or three or more press parts 13 may be located at a position corresponding to the shoulder region in the barrel part Cb of the container C.

The preform 2 may be of any of various shapes depending on the shape of the molded liquid-containing container C and the like.

In the formation of the headspace HS, a method of discharging the liquid L from the molded container C (e.g. a method of returning the liquid L from the container C to the nozzle unit 20 by suck back or the like) may be additionally employed in order to expand the headspace HS.

REFERENCE SIGNS LIST 1A, 1B manufacturing device
2 preform
2a mouth part
2b barrel part
10, 10' blow molding mold
11, 11' mold body part
12 reversal panel formation part
12a convex surface
13 press part
14 cavity
20 nozzle unit
21 main block
22 filling nozzle
22a nozzle body
22b sandwiching part
23 liquid supply path
24 piping
25 pressurized liquid supply part
26 seal body
27 stretching rod
L liquid (content liquid)
HS headspace
C container
Ca mouth part
Cb barrel part
Cc reversal panel
Cd bottom part
O central axis

The invention claimed is:

1. A liquid-containing container manufacturing method of manufacturing a liquid-containing container containing a content liquid from a synthetic resin-made preform using a manufacturing device that includes a blow molding mold and a nozzle unit, the blow molding mold including a reversal panel formation part, the manufacturing device including a press part, and the liquid-containing container manufacturing method comprising:

a liquid blow molding step of, in a state in which the reversal panel formation part forms a convex surface projecting toward inside of a cavity, supplying a pressurized liquid into the preform placed in the cavity from the nozzle unit, to mold the preform into a container including a reversal panel formed by the reversal panel formation part; and a headspace formation step of pressing the container by the press part to reverse the reversal panel so as to project toward outside of the container, and thereafter releasing press by the press part to increase a volume of the container and thereby form a headspace.

2. The liquid-containing container manufacturing method according to claim 1, wherein the blow molding mold includes the press part, the cavity is deformable from a first form in which the reversal panel formation part forms the convex surface projecting toward the inside of the cavity to a second form in which the reversal panel formation part retreats toward outside of the cavity and the press part advances toward the inside of the cavity, in the liquid blow molding step, the pressurized liquid is supplied into the preform placed in the cavity in the first form from the nozzle unit, to mold the preform into the container including the reversal panel formed by the reversal panel formation part, and in the headspace formation step, the cavity is deformed into the second form to press the container by the press part and reverse the reversal panel so as to project toward the outside of the container, and thereafter the press by the press part is released to increase the volume of the container and thereby form the headspace.

3. The liquid-containing container manufacturing method according to claim 2, wherein the blow molding mold includes a pair of reversal panel formation parts facing each other and each being the reversal panel formation part and a pair of press parts facing each other and each being the press part, the reversal panel formation parts and the press parts alternate in a circumferential direction in a predetermined cross section orthogonal to a central axis of the cavity, and the cavity is deformable from the first form in which the pair of reversal panel formation parts each form the convex surface to the second form in which the pair of reversal panel formation parts each retreat toward the outside of the cavity and the pair of press parts each advance toward the inside of the cavity,
- in the liquid blow molding step, the pressurized liquid is supplied into the preform placed in the cavity in the first form from the nozzle unit, to mold the preform into the container including a pair of reversal panels formed by the pair of reversal panel formation parts, and
- in the headspace formation step, the cavity is deformed into the second form to press the container by the pair of press parts and reverse the pair of reversal panels so as to each project toward the outside of the container, and thereafter the press by the pair of press parts is released to increase the volume of the container and thereby form the headspace.

4. The liquid-containing container manufacturing method according to claim 1, wherein in the headspace formation step, the container is pressed by the press part to reverse the reversal panel so as to project toward the outside of the container, in a state in which a mouth part of the container is closed.

5. The liquid-containing container manufacturing method according to claim 2, wherein in the headspace formation step, the container is pressed by the press part to reverse the reversal panel so as to project toward the outside of the container, in a state in which a mouth part of the container is closed.

6. The liquid-containing container manufacturing method according to claim 3, wherein in the headspace formation step, the container is pressed by the press part to reverse the reversal panel so as to project toward the outside of the container, in a state in which a mouth part of the container is closed.

* * * * *